US010925282B2

(12) United States Patent
Jenneman

(10) Patent No.: US 10,925,282 B2
(45) Date of Patent: Feb. 23, 2021

(54) ENHANCED KILL OF MICROORGANISMS

(71) Applicant: CONOCOPHILLIPS COMPANY, Houston, TX (US)

(72) Inventor: Gary Jenneman, Bartlesville, OK (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 16/399,314

(22) Filed: Apr. 30, 2019

(65) Prior Publication Data

US 2019/0315638 A1  Oct. 17, 2019

Related U.S. Application Data

(63) Continuation-in-part of application No. 15/951,584, filed on Apr. 12, 2018, now abandoned.

(60) Provisional application No. 62/485,176, filed on Apr. 13, 2017.

(51) Int. Cl.
A01N 35/04 (2006.01)
A01N 59/00 (2006.01)
C02F 1/50 (2006.01)
A01N 35/02 (2006.01)
C09K 8/52 (2006.01)
C09K 8/60 (2006.01)
C02F 103/10 (2006.01)
C02F 103/36 (2006.01)

(52) U.S. Cl.
CPC ............ A01N 35/04 (2013.01); A01N 35/02 (2013.01); A01N 59/00 (2013.01); C02F 1/50 (2013.01); C09K 8/52 (2013.01); C09K 8/605 (2013.01); C02F 2103/10 (2013.01); C02F 2103/365 (2013.01); C02F 2303/04 (2013.01)

(58) Field of Classification Search
CPC ........ A01N 35/02; A01N 59/00; A01N 35/04; C09K 8/605; C09K 8/52; C02F 1/50; C02F 2103/365; C02F 2303/04; C02F 2103/10

See application file for complete search history.

(56) References Cited

U.S. PATENT DOCUMENTS

| 4,620,595 | A | 11/1986 | Schutt |
| 4,920,141 | A | 4/1990 | Horstmann et al. |
| 4,923,899 | A | 5/1990 | Wachman et al. |
| 4,995,987 | A | 2/1991 | Whitekettle et al. |
| 5,034,155 | A | 7/1991 | Soeder et al. |
| 5,385,842 | A | 1/1995 | Weimer et al. |
| 5,405,531 | A | 4/1995 | Hitzman et al. |
| 5,750,392 | A | 5/1998 | Hitzman et al. |
| 5,789,236 | A | 8/1998 | Jenneman |
| 6,309,597 | B1 | 10/2001 | Ballinger, Jr. et al. |
| 7,833,551 | B2* | 11/2010 | Jenneman ............ A61K 31/425 424/617 |
| 8,846,732 | B2* | 9/2014 | Jenneman ............ A61K 31/275 514/373 |
| 9,089,514 | B2 | 7/2015 | Burger et al. |
| 2001/0036667 | A1 | 11/2001 | Tayebi et al. |
| 2002/0160946 | A1* | 10/2002 | Yano ........................ C07K 11/02 514/3.4 |
| 2004/0265280 | A1* | 12/2004 | Yano .......................... C07K 7/06 424/93.4 |
| 2005/0238729 | A1* | 10/2005 | Jenneman ............ A61K 31/275 424/617 |
| 2007/0255500 | A1 | 11/2007 | Pita et al. |
| 2010/0190666 | A1 | 7/2010 | Ali et al. |
| 2011/0020467 | A1* | 1/2011 | Jenneman ............ A61K 31/425 424/617 |
| 2012/0022841 | A1 | 1/2012 | Appleyard |
| 2012/0059640 | A1 | 3/2012 | Roy et al. |
| 2018/0295838 | A1 | 10/2018 | Jenneman |

FOREIGN PATENT DOCUMENTS

| CN | 1100251 | 3/1995 |
| EP | 0354336 A1 | 2/1990 |
| ES | 2050627 | 5/1994 |
| GB | 1443786 | 7/1976 |
| GB | 0623547.7 | 10/2009 |
| JP | 07090639 | 4/1995 |
| WO | 1991016083 | 10/1991 |

OTHER PUBLICATIONS

Burger, E.D.—"Synergism of anthraquinone with an oilfield biocide to inhibit sulfide generation from sulfate-reducing bacteria", 2004, Paper 04750, NACE International; 11 pgs.
Chapman, A.G., et al—"Adenylate Energy Charge in *Escherichia coli* During Growth and Starvation", 1971, Journal of Bacteriology, American Society for Microbiology, vol. 108, Issue No. 3; 15 pgs.
Cooling, F.B.III, et al—"Inhibition of Sulfate Respiration by 1,8-Dihydroxyantrhaquinone and Other Anthraquinone Derivatives", 1996, Applied and Environmental Microbiology, vol. 62, Issue No. 8, American Society for Microbiology; 6 pgs.
Kaprelyants, Arseny S., et al—"Dormancy in non-sporulating bacteria", 1993, FEMS Microbiology Reviews, 104, FEMSRE 00275, Federation of European Microbiological Societies, Elsevier; 15 pgs.
Keasler, Vic, et al—"Expanding the microbial monitoring toolkit: Evaluation of traditional and molecular monitoring methods", 2013, International Biodeterioration & Biodegradation, vol. 81, Elsevier; 6 pgs.

(Continued)

Primary Examiner — Blessing M Fubara
(74) Attorney, Agent, or Firm — Boulware & Valoir

(57) ABSTRACT

A process is provided for the time dependent reduction and kill of cellular bacteria in a fluid by sequential exposure to nitrites and a low concentration of biocide. Oilfield water containing sulfate-reducing bacteria can be supplied with a timed sequential exposure of nitrite and biocide. The timed sequential addition of the biocide following exposure to the nitrite provides enhanced kill of the sulfate-reducing bacteria at concentrations of biocide that are lower than would be possible using simultaneous addition of these materials.

25 Claims, 1 Drawing Sheet

(56) References Cited

OTHER PUBLICATIONS

Kim, Jaeeun, et al—"Tolerance of dormant and active cells in Pseudomonas aeruginosa PA01 biofilm to antimicrobial agents", 2009, Journal of Antimicrobial Chemotherapy, vol. 63; 7 pgs.
Liu, He, et al—"Chemical inhibitors of methagenesis and putative applications", 2011, Appl Microbiol Biotechnol, 89, Springer Verlag; 8 pgs.
Xue, Yuan, et al—"Control of Microbial Sulfide Production with Biocides and Nitrate in Oil Reservoir Simulating Bioreactors", 2015, Frontiers in Microbiology, vol. 6, Article 1387, Crossmark; 11 pgs.
Nemati, M., et al—"Mechanistic Study of Microbial Control of Hydrogen Sulfide Production in Oil Reservoirs", 2001, Dept. of Biological Sciences, University of Calgary, Calgary, Alberta, Canada, John Wiley & Sons, Inc.; 11 pgs.
Greene, E.A., et al—"Nitrite reductase activity of sulphate-reducing bacteria prevents their inhibition by nitrate-reducing, sulphide-oxidizing bacteria", 2003, Environmental Microbiology, 5 (7); 11 pgs.
Postgate, J.R., "Competitive and Non-competitive Inhibitors of Bacterial Sulphate Reduction", 1952, J. gen. Microbiol. 6; 15 pgs.
Postgate, J.R.—"The Sulfate-Reducing Bacteria", 1984, Cambridge University Press; Abstract.
"Standard Methods for the Examination of Water and Wastewater", 1992, American Public Health Association, Washington, DC, et al; 12 pgs.
Cord-Ruwisch, Ralf—"A quick method for determination of dissolved and precipitated sulfides in cultures of sulfate-reducing bacteria", 1985, Journal of Microbiological Methods, vol. 4, pp. 33-36; 4 pgs.
Burger, et al—"The impact of dissolved organic carbon type on the extent of reservoir souring", 2013, SPE International on Oilfield Chemistry, The Woodlands, TX Apr. 8-10, 2013, SPE 164068; 13 pgs.
Carlson, Hans K., et al—"Monofluorophosphate is a selective inhibitor of respiratory sulfate-reducing microorganisms", 2015, Environ. Sci. Technol. 49, ACS Publications, pp. 3727-3736; 10 pgs.
NACE Standard Test Method—"Field Monitoring of Bacterial Growth in Oil and Gas Systems", 2014, NACE TMO 194-2004, Item No. 21224, NACE International; 32 pgs.
Taylor, Barrie F., et al—"Depletion of Adenosine Triphosphate in Desulfovibrio by Oxyanions of Group VI Elements", 1979, Current Microbiology, vol. 3, Issue No. 2, pp. 101-103; 3 pgs.
Coombe, D., et al—"Simulation of Bacterial Souring control in an Albertan Heavy Oil Reservoir", 2009, 10th Canadian International Petroleum Conference (the 60th Annual Technical Meeting of the Petroleum Society), Jun. 16-18, in Calgary, Alberta Canada; 9 pgs.
Haghshenas, Mehdi—"Modeling and Remediation of Reservoir Souring", 2011, PhD. Thesis, The University of Texas at Austin, 242 pgs.
Lambo, et al—"Competitive, microbially mediated reduction of nitrate with sulfide and aromatic oil components in a low-temperature, Western Canadian oil reservoir.", 2008, Environ. Sci. Technol. 42, 88941-8946; 6 pgs.
Burger, et al—"Forecasting the effect of produced water reinjection on reservoir souring in the Ekofisk field", Corrosion 2006, National Association of Corrosion Engineers' 61st Annual Conference and Exhibition, Mar. 12-16, San Diego, CA NACE 06661; 19 pgs.
Burger, et al, "A mechanistic model to evaluate reservoir souring in the Ekofisk field", 2005 SPE International Symposium on Oilfield Chemistry, Houston, TX Feb. 2-4, 2005, SPE 93297.
Burger, et al—"Forecasting the effects of reservoir souring from waterflooding a formation containing siderite", 2009, SPE International Symposium on Oilfield Chemistry, The Woodlands, TX Apr. 20-22, 2009, SPE 121432; 16 pgs.
Zuluaga, et al—"Technical Evaluations to Support the Decision to Reinject Produced Water", 2010, SPE Annual—Technical Conference and Exhibition, Florence, Italy, Sep. 20-22, SPE 132346; 12 pgs.
Burger, et al—"On the partitioning of hydrogen sulfide in oilfield systems", 2013, SPE International Symposium on Oilfield Chemistry, The Woodlands, TX Apr. 8-10, 2013, SPE 164067; 10 pgs.
MA Reinse, et al., Control of microbial souring by nitrate, nitrite or glutaraldehyde injection in a sandstone column, Journal of Industrial Microbiology (1997) 17, 128-136.
S. Haveman, et al., Physiological and Gene Expression Analysis of Inhibition of Desulfovibrio vulgaris Hildenborough Nitrite, Journal of Bacteriology, vol. 186, No. 23, Dec. 2004, p. 7944-7950.
Kaster, et al., "Effect of nitrate and nitrite on sulfide production by two thermophilic, sulfate-reducing enrichments from an oil field in the North Sea," Appl. Microbiol. Biotechnol. 132: (2007).
International Search Report for PCT/US2018/027277, dated Jun. 22, 2018.
Arensdoif, J. J., Miner, K., Ertmoed, R., Clay, W. K., Stadnicki, P., & Voordouw, G. (Jan. 1, 2009) Mitigation of Reservoir Souring by Nitrate in a Produced-Water Reinjection System in Alberta. Society of Petroleum Engineers. doi:10.21181121731-MS.
Burger, E. D., Andrade, C. de A., Rebello, M., & Ribeiro, R. (Jan. 1, 2007). Flexible Treatment Program for Controlling H2S in FPSO Produced Water Tanks. Society of Petroleum Engineers. doi:10.2118/106106-MS.
Law, M. D., Kretsinger, M. B., Burger, E. D., Soncenenberger, J. G., & Ulman, M. A. (Jan. 1, 2001). A Field Case History; Chemical Treatment of a Produced-Water Injection System Using Anthraquinone Improves Water Quality and Reduces Costs. Society of Petroleum Engineers. doi:10.2118/65023-MS.

* cited by examiner

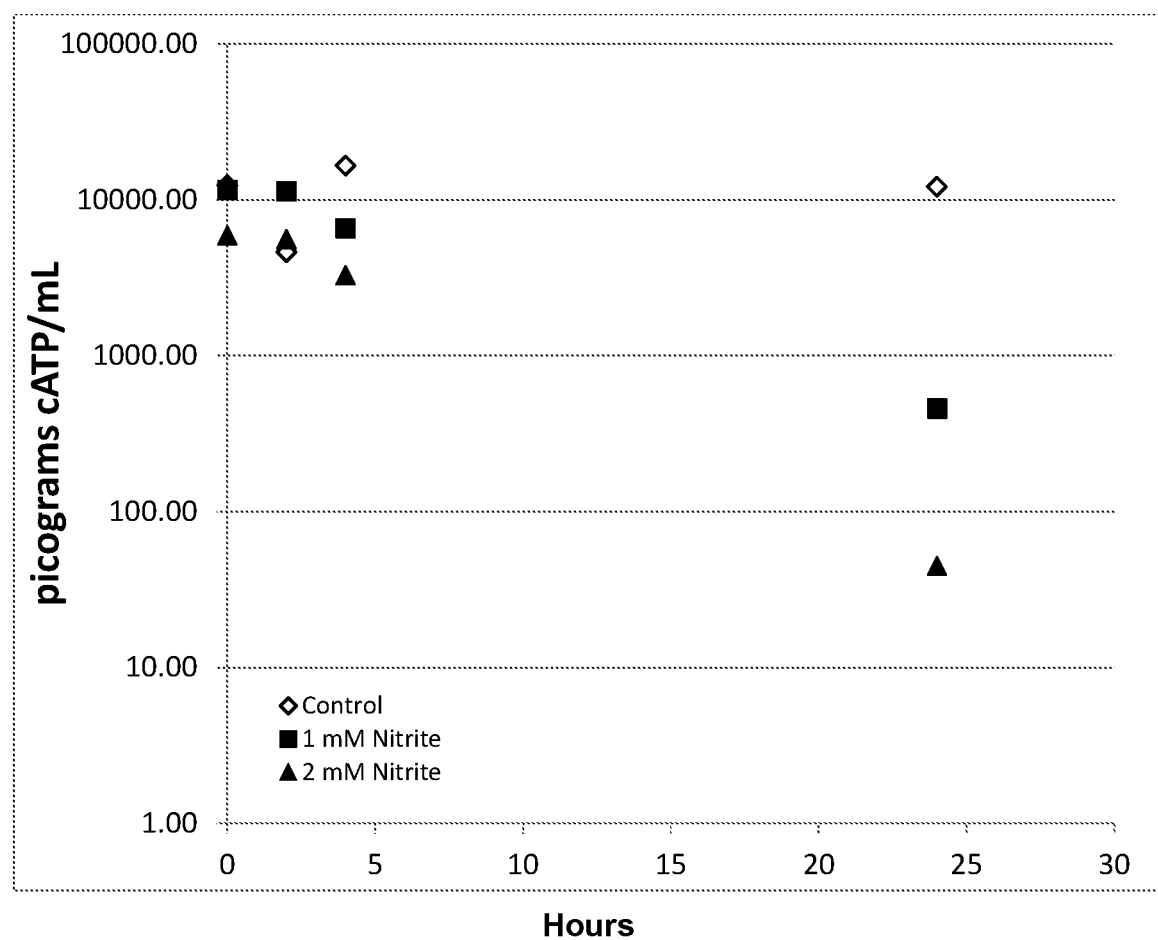

ENHANCED KILL OF MICROORGANISMS

CROSS-REFERENCE TO RELATED APPLICATIONS

This application is a continuation-in-part application of U.S. Ser. No. 15/951,584, filed Apr. 12, 2018, pending, which claims benefit under 35 USC § 119(e) to U.S. Provisional Application Ser. No. 62/485,176 filed Apr. 13, 2017, entitled "ENHANCED KILL OF SULFATE REDUCING BACTERIA USING TIMED SEQUENTIAL ADDITION OF OXYANION AND BIOCIDE," which is incorporated herein in its entirety.

STATEMENT REGARDING FEDERALLY SPONSORED RESEARCH

None.

FIELD OF THE INVENTION

The present invention relates generally to the control of biogenic sulfide production. More particularly, but not by way of limitation, embodiments of the present invention concern the use of at least one ATP-reducing agent followed by at least one biocide to synergistically enhance the kill of microbes, such as sulfate-reducing microorganisms, acetogenic microorganisms, other Bacteria, as well as, methanogens, and other Archae that lead to corrosion or biofouling of equipment, especially oilfield and downstream equipment.

BACKGROUND OF THE INVENTION

The presence of sulfides (e.g., $H_2S$, HS—, and $S_2$—) in fluids poses serious problems due to their toxicity, odor, and corrosive nature. It is well known that the presence of sulfides in many fluids is a consequence of the reduction of sulfates to sulfides by sulfate-reducing microorganisms (SRM), such as sulfate reducing bacteria, but including other cells types. For example, acetogenic bacteria, acid producing bacteria (APB), methanogenic microorganisms and other archaea can also be involved in corrosion of industrial or oilfield equipment and reservoir souring.

SRM are routinely found in water associated with oil production systems and can be found in virtually all industrial aqueous processes including, for example, cooling-water systems, pulp and paper-making systems, chemical manufacturing, and petroleum refining. As such, their presence causes corrosion and destruction of equipment, and there is a great need to inhibit or kill such microbes.

It is already well known to use nitrite and biocide simultaneously to inhibit sulfate reducing bacteria (SRB) (see e.g., U.S.20050238729, U.S. Pat. No. 8,846,732), and it is hereby learned that improvements can be had by first using a nitrite and after a period of time applying the biocide (see e.g., U.S.20180295838, incorporated by reference in its entirety for all purposes). Further improvements and/or expansion of suitable chemicals and expansion to other microorganisms would be beneficial, and this application addresses one or more of those improvements, as well as the original inventive material.

BRIEF SUMMARY OF THE DISCLOSURE

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

The invention includes methods of killing various microorganisms, including sulfate-reducing microorganisms or "SRMs", by first contacting the cells with a first concentration of an ATP-reducing agent for a period of time until cellular ATP is reduced, but the cells are only stressed, not killed. Thereafter, we contact the cells with a second concentration of a biocide, thereby killing the cells.

ATP is a nucleoside triphosphate and consists of three components: a nitrogenous base (adenine), the sugar ribose, and the triphosphate. This complex organic chemical provides the energy to drive many processes in living cells, e.g. muscle contraction, nerve impulse propagation, and chemical synthesis. Found in all forms of life, ATP is often referred to as the "molecular unit of currency" of intracellular energy transfer. When consumed in metabolic processes, it is converted either to adenosine diphosphate (ADP) or to adenosine monophosphate (AMP), and other processes regenerate ATP so that the human body recycles its own body weight equivalent in ATP each day. It is also a precursor to DNA and RNA, and is used as a coenzyme. As such, ATP is a critical molecule in the cell and depletion of ATP causes severe cellular stress, and can lead to cell or organismal death.

The ATP-reducing agent used herein is any chemical that reduces the ATP levels in the microbial cells being treated. The reduction can be by any mechanism, e.g., degrading ATP, preventing its regeneration from ADP or AMP, by creating conditions such that ATP is used at higher rates than normal, ATPase activators, ATP synthase inhibitors, and the like.

Nitrite, for example, inhibits dissimilatory sulfite reductase (DSR)—the enzyme that catalyzes the reduction of sulfite to sulfide. Nitrite, which is a potent competitive inhibitor of DSR, causes a rapid and drastic decrease of the concentration of ATP in cells. Nitrite is also known to downregulate the genes encoding for ATP production in some SRM, and the removal of nitrite by some SRM is mediated by a periplasmic nitrite reductase that requires that reducing equivalents used for ATP production be re-routed for reduction of nitrite to ammonium ions, which has the effect of reducing cellular ATP levels.

The ATP-reducing agent must reduce the cellular ATP concentration of the cells by at least 50%, preferably at least 90%, 95%, 96%, 97%, 98% or 99% from an untreated control. The ATP-reducing agents for SRM may be selected from the group consisting of nitrite, nitrate, molybdate, arsenate, chromate, tungstate, chlorate, perchlorate, thiosulfate, fluorosulfate, selenite, selenate, monofluorophosphate, 9,10 anthraquinone (and its various derivatives), phenolic lipids (e.g., alkyl resorcinols) and combinations of one or more thereof.

For a more complete listing of respiratory sulfate reduction inhibitors and their potential impact on ATP levels see Carlson et al. (2015). Also, Postgate (1952) lists numerous competitive and non-competitive inhibitors of sulfate reduction but nothing is reported about their effect on ATP levels. Oremland (1979) found that only a 30-minute exposure to 20 mM chromate and tungstate reduced ATP levels of a freshwater denitrifying culture by 38% and 41%, respectively. Cooling III et al. (1996) reported the ability of anthraquinones to inhibit sulfate reducing bacteria and attributed this effect to the uncoupling of electron transfer from ATP synthesis. However, they also stated: "The specificity of the inhibition for sulfate reducing bacteria was not broadly investigated here; however, specificity is unlikely to be absolute if redox uncoupling of electron transfer is the sole mechanism of inhibition". They further suggest that inhibition of ATP synthesis for other bacterial types by anthraquinones is a possibility.

It is also well known that 2-bromoethanesulfonate and 2-chloroethanesulfonate, as well as other chemicals, are inhibitors of methanogenesis, but their effect on cellular ATP levels has not been reported. (Wang et al. 2011). A review of dormancy in non-sporulating bacteria by Kaprelyants et al. (1993) revealed that alkyl resorcinols administered exogenously induced the formation of "dormant-like" *Bacillus cereus* cells that displayed decreased metabolic activity. Kaprelyants further assert that dormancy in bacteria brought on by starvation is often accompanied by a decrease in endogenous respiration which results in a concomitant decrease in ATP.

The ATP-reducing agent is added to undesirable cells for a specific time period, such as between 2 hours and 2 weeks, e.g., 2 hours, 4 hours, 8 hours, 10 hours, 15 hours, 20 hours, 24 hours, 30 hours, 40 hours, 48 hours, 60 hours, 3 days, 4 days, 5 days, 1 week, 10 days, or 2 weeks. The optimal time is determined by developing an ATP concentration vs. time curve for one or more concentrations of the ATP-reducing agent to be tested, as shown in FIG. 1. Generally, the shortest time period that can conveniently be used is selected, e.g., 1-12, or 2-4 hr or overnight or about 24 hr, balancing time against concentrations given the large volumes to be treated.

Once ATP levels are reduced, or are predicted to be reduced based on bench top experiments, an active biocide is added to the cells in the industrial environment of interest, e.g., oilfield waters. The biocide may be selected from the group consisting of formaldehyde, glutaraldehyde, acrolein, quaternary amine compounds, cocodiamines, bronopol, 2-2-dibromo-3-nitrilo-propionamide (DBNPA), isothiazolones, carbamates, metronidazole, tetrakis hydroxymethyl phosphonium dulfate (THPS), tributyl tetradecyl phosphonium chloride (TTPC), plus oxidizing biocides such as, chlorine, bromine, hypochlorite, chlorine dioxide, hydrogen peroxide, peracetic acid, ozone, etc. and combinations of one or more thereof. Importantly, less biocide need be used that would otherwise be needed with biocide alone or with simultaneous reagent use due to the cell stress resulting from reduced ATP levels.

In some embodiments, the ATP-reducing agent is a combination of more than one individual ATP-reducing agent and/or the biocide is a combination of more than one individual biocide.

As noted, the ATP-reducing agent stresses the cells without directly killing them (i.e., sublethal stress), and the biocide is able thereby to more quickly and effectively kill the stressed cells. Although not proven, it is hypothesized herein that the reduction in cellular ATP levels (as compared to pretreated cells) make the cells much more susceptible to the biocidal effect of the subsequent biocide. Thus, the treated water can be more effectively cleared of cells with less chemical use overall, especially less of the more toxic biocides.

The aqueous medium containing the cells may be any industrial water, including sewage waters, oilfield waters, a subterranean reservoir, oil storage and other chemical tanks, pipelines, or any other equipment that may be contaminated with sulfate-reducing or other bacteria or microorganisms.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the claims.

The following abbreviations may be used herein:

| Abbreviation | Meaning |
| --- | --- |
| APB | Acid producing bacteria |
| ATP | Adenosine triphosphate - the energy unit of cells |
| cATP | Cellular ATP |
| DBNPA | 2-2-dibromo-3-nitrilo-propionamide |
| GA | Glutaraldehyde |
| GHB | General Heterotrophic Bacteria |
| MIC | Minimum inhibitory concentration - the lowest concentration of a chemical, that prevents visible growth of bacterium |
| SRB | Sulfate reducing bacteria |
| SRM | Sulfate reducing microorganisms |

BRIEF DESCRIPTION OF THE DRAWINGS

FIG. 1. Experimental results of cellular ATP concentration vs. time for an SRB culture treated with two concentrations of nitrite.

DETAILED DESCRIPTION

Disclosed herein are various illustrative embodiments of a process for the time dependent reduction and kill of microbes in various industrial aqueous media by a timed sequential exposure to ATP-reducing agents and a lower concentration of an active biocide than would be used with either agent alone, or both agents used simultaneously, or both agents in the reverse order.

As used herein, a "biocide" is an agent or chemical that kills cells immediately (within 1-4 hours) of addition to the cells.

There is another class of biocides used in the O&G industry referred to as "preservative" chemistries. This are very slow acting sometimes taking as much as 24 hours or so to become fully active. Examples include CTAC: cis/trans 1-3,5,7 triaza-1-azoniadamantane chloride; Dazomet: tetrahydro-3,5-dimethyl-2H-1,3,5 thiadiazinethione; THMN: 2-hydroxymethyl-2-nitropropane-1,3 diol; and DMO: 4,4-dimethyloxazolidine are all such examples of preservative biocides. These are employed in cases where fast kill time is not as important, e.g., downhole or in stagnant, slow moving systems. They tend to have a little more persistency in the environment and thus longer lasting protection. It is not clear if such biocides would perform as well in the current invention, however, it remains a strong possibility that they would function to a certain degree. It may be needed to add them sooner than one would a more active biocide, but bench top experiments such as described herein will determine these details.

As used herein, an "ATP-reducing agent" is an agent or chemical that reduces the intercellular levels of ATP as compared to the pre-treatment levels. Our results suggest significant reduction is needed, e.g., 90%, 99%, or more, but it may be possible to see a similar effect with a lesser reduction of ATP levels such as 50%.

For example, oilfield water containing microbes, such as sulfate-reducing bacteria, acetogenic or other acid producing bacteria (APB), or methanogenic and other undesirable archaea can be supplied with a timed sequential exposure of an ATP reducing agent, such as nitrite, followed by a reduced concentration of biocide. The timed sequential addition of the biocide after exposure to the ATP-reducing agent provides enhanced cell kill at concentrations of biocide that are substantially lower than would be possible using biocide alone, or simultaneous addition of the two agents or a reversed addition thereof.

In certain illustrative embodiments, a method of killing sulfate-reducing bacteria and other microorganisms in oilfield and other industrial waters is provided. The e.g., industrial water is contacted with a first concentration of an ATP-reducing agent selected from the group consisting of nitrite, nitrate, molybdate, arsenate, chromate, tungstate, chlorate, perchlorate, thiosulfate, fluorosulfate, selenite, selenate, monofluorophosphate, 9,10 anthraquinone (and its various derivatives), phenolic lipids (e.g., alkyl resorcinols) and combinations of one or more thereof.

A period of time is allowed to lapse, so as to reduce ATP levels by at least 50%, preferably at least 90%, 95%, 97%, 98%, or 99%. The lower the concentration of ATP-reducing agent the longer the time one would have to wait to reach the critical cATP reduction. The higher the concentration the shorter the time to wait. Thus, an optimal level can be selected based on cost, time and volume considerations to achieve a sublethal stress.

Once cellular ATP levels are reduced e.g., at least 90%, the biocide is added at a concentration that is reduced over biocide use alone, is reduced over simultaneous agent use, and is reduced over biocide use followed by ATP-reducing agent. In other words, the timed sequential addition of these two agents allows the least concentration of biocide to be used, saving greatly on biocide costs, especially when treating huge volumes of industrial waters. If needed, the treatment reagents can be circulated through the equipment during the treatment periods. In other contexts, mere addition and soaking may suffice.

The biocide can be selected from the group consisting of formaldehyde, glutaraldehyde, acrolein, quaternary amine compounds, cocodiamines, bronopol, 2-2-dibromo-3-nitrilo-propionamide (DBNPA), isothiazolone, carbamates, metronidazole, THPS, TTPC, and combinations of one or more thereof.

The method provides contacting SRB in industrial equipment (e.g., tanks, cooling water, pipelines, near wellbore, and frac ponds) with, e.g., 0.0003% to 3% ATP-reducing agent for anywhere from two hours to two weeks. One hour may also be satisfactory in some cases, as there are examples in literature of inhibitors that can drop ATP by 90% in an hour or even 30 minutes at relatively high concentrations of inhibitor. The desired contact time may be measured by in bench top tests simulating actual use conditions, and thereafter used without testing ATP levels mid treatment.

For example, 10 barrels of nitrite solution are pumped into equipment at 1 barrel per minute until exhausted followed by a 24 hour wait, and then followed with e.g., 10 barrels of 2% GA until exhausted. Once the GA reaches throughout the pipes and equipment, the fluids can be left to soak 2 hours-2 weeks, typically 12-24 hrs or 48 hrs dependent upon conditions and cell levels, or the fluid can be circulated throughout equipment. This will provide sufficient time to kill the cells, before the equipment is reopened, purged or rinsed, and work continues. As with the ATP-reducing agent, kill time can be estimated in bench top tests, as provided herein, and then the estimated time employed in actual use.

For oilfield applications, the aqueous solution in which the chemicals are dissolved may be any solution suitable for use in a hydrocarbon reservoir, including water, brine, salt water, reclaimed water, produced water, sea water, aquifer water, river water, and the like. We have used a synthetic brine in our proof of concept experiments, because brine is so often found in oilfields and oilfield equipment.

In some embodiments, the treated water may also be pH balanced, deoxygenated, filtered, treated to reduce dissolved solids, diluted and/or mixed with other solutions. In another embodiment, deoxygenation is not required because corrosion is not a problem, thus obviating the need for deoxygenation. Further, ATP-reducing agent treatment followed by biocide may in some conditions allow use of e.g., treated water without significant further treatment.

In certain illustrative embodiments, the ATP-reducing agent can be a combination of more than one individual oxyanion and/or the biocide can be a combination of more than one individual biocide. Further, the ATP-reducing agent can comprise nitrite or consist essentially of nitrite, and the biocide can comprise glutaraldehyde or consist essentially of glutaraldehyde.

In the case of anthraquinone, the active ingredient is often a water-soluble derivative of anthraquinone referred to as either anthrahydroquinone, dialkali salt or 9,10-anthracenediol, disodium salt. Anthraquinone as a respiratory inhibitor of SRB can reduce cATP concentrations.

The patent by Berger and Youngren, as well as, a recent article by Berger discuss the synergistic activity of adding a biocide with the anthraquinone to inhibit SRB activity. However, it is stated that the biocide kills or stresses the SRB while the time release effect of the anthraquinone extends the inhibition of the $H_2S$ production by the SRB. Nothing is stated about the ability of the anthraquinone to enhance the ability of the biocide to kill the SRB. In fact, no claims are made about enhanced kill of SRB, only enhanced inhibition of SRB activity by anthraquinone and biocide. Thus, this work does not anticipate or predict the enhanced effects provided by the claimed method.

Generally speaking, the ATP-reducing agent lowers the cATP level of the cells—thus stressing without directly killing them (i.e., sublethal stress), thus allowing the active biocide to directly kill the cells. Because the cells are dead following the treatment—not just inhibited as with simultaneous use of the chemicals—continuous exposure of the chemicals is not required to control further activity. Also, the pre-exposure to the ATP-reducing agent stresses the cells allows for much lower cidal doses of biocide to be used than heretofore possible. This can result in significant cost savings as well as being beneficial for the environment since less toxic material is used.

The following examples of certain embodiments of the disclosed subject matter are given. Each example is provided by way of explanation of the disclosed subject matter, one of many embodiments of the disclosed subject matter, and the following examples should not be read to limit, or define, the scope of the disclosed subject matter.

Test 1

An initial test was performed to examine the effects of nitrite on cellular adenosine triphosphate (cATP) response in a Barnett sulfate reducing bacteria (SRB) culture. Keasler et al. (2012) taught us that enhanced kill of bacterial cultures (i.e., SRB, APB, and GHB) by biocides (i.e., glutaraldehyde, quaternary amines and THPS) is related to cell dormancy, which they defined as a mildly stressful condition related to the ratio of cAMP/cATP or AMPi (AMP index). In general, an AMPi<0.1 indicates no stress but an AMPi>1 indicates the presence of stress. Thus, an AMPi between 0.1 and 1 indicates a mildly stressful condition or dormancy. An AMPi of >3 represents lethal stress.

Keasler et al. demonstrated these values by starving bacterial cultures for 3 weeks whereon the SRB, APB, and GHB cultures entered a dormant stage as indicated by an AMPi of 0.42. (Table 5). Subsequent application of 100 ppm biocide to these dormant cells resulted in decreases in cATP of ≥96%, and enhanced kill (i.e., at least a 4 log greater reduction using a serial dilution method; see Table 5) in viable cells vs. kill observed on non-starved cells using the same concentrations of biocides (Table 4).

Interestingly, Keasler et al. (2012) saw enhanced kill of APB and GHB in addition to SRB when applying biocide to stressed/dormant cells following starvation. Unfortunately, it is unclear if Keasler actually measured cATP concentrations for starved cells of all cell types prior to biocide addition since only a single value was reported for untreated starved cells (Table 5, Blank) which is higher than that for untreated non-starved cells (Table 4, Blank) Regardless, Keasler teaches us nothing about the effect of ATP-reducing agents or oxyanions on dormancy, on AMPi, or cATP reductions, and nothing about the rate of cATP reductions in the presence of oxyanions and other ATP-reducing agents. Further, the work is of limited value since it is difficult (if not impossible) to starve cells in the field. Nevertheless, the idea was intriguing and lead to our further work in this area to develop a method that would be effective in industrial and field environments.

A review of dormancy in non-sporulating bacteria by Kaprelyants et al. indicates that dormancy is a function of bacterial starvation and is often accompanied by a decrease in cellular ATP content, but the rate of decline is very dependent on the bacterial species. However, they see dormancy as a state of enhanced survival for the bacterium as dormant cells display a capacity for prolonged survival, as well as, a resistance to antibiotics and other environmental insults. Therefore, the enhanced sensitivity of dormant cells to biocides was not even considered. Kaprelyants et al. report that phenolic lipids such as alkyl resorcinols exogenously administered to cells of *Bacillus cereus* induced the formation of dormant-like cells, which displayed a decrease in metabolic activity and an ability to resist cell lysis in nutrient free buffer. However, nothing was reported about enhanced sensitivity of dormant cells to biocides. Indeed, dormancy is thought to increase cell resistance to death.

Chapman et al. (1971) defined metabolic activity in bacterial cultures based on the energy charge which they defined as the ratio of [(ATP)+½ (ADP)]/[(ATP)+(ADP)+ (AMP)]. They maintained that cells could only grow at energy charge values above about 0.8 but could retain viability between 0.5 and 0.8. Below 0.5 the cells would die (i.e., lethal stress). Although Chapman et al. teach us about the relationships between ATP, ADP, and AMP to cell growth, viability, and lethal stress (i.e. cell death) they do not teach us about the effect of ATP reducing agents or oxyanions on cell death, and nothing about the rate of cATP reductions in the presence of oxyanions and other ATP-reducing agents. Also, they teach us nothing about the coupling of ATP reducing agents to biocides to achieve enhanced kill.

Kim et al. (2009) found that dormant cells of *Pseudomonas aeruginosa* PA01 grown under anaerobic conditions were more susceptible to the biocide, chlorine than active cells of *Ps. aeruginosa* grown under aerobic conditions. However, they attributed this tolerance to the denser intracellular components of the metabolically active cells that can react with highly reactive chlorine species and not to reductions in cATP levels. In addition, they say nothing about the use of ATP-reducing agents to achieve dormancy or stress in the bacterial cells.

Standard SRB bottles (1% NaCl) were utilized in our initial test. Sterile pipets, and not syringes, were used to add chemicals and inocula. Serial dilutions were done with syringes. Serial dilutions were performed outside of the anaerobic glove box, but otherwise, the steps were performed inside a glove box using aseptic technique.

Sterile, anaerobic, 0.01 M sodium phosphate buffered saline (pH=7.0) containing 1% NaCL (herein called 'synthetic brine') prepared the day of test was utilized both as the cell medium and as a carrier for the test reagents. For the 200 mM stock $NaNO_2$ solution, 13.8 g $NaNO_2$ were added per 100 mL of synthetic brine.

The procedure for the nitrite/cATP test (FIG. 1) was as follows:

Label 3×50 mL, sterile, anaerobic serum bottles as follows: #1 Control (no nitrite); #2 1 mM Nitrite; #3 2 mM Nitrite.

Add 20 mL of synthetic brine to each of the 3 test bottles in Step 1.

Add 20 mL of SRB inocula to each of the 3 test bottles.

Add 0.2 mL of $NaNO_2$ solution to bottle #2 and 0.4 mL of $NaNO_2$ solution to bottle #3.

Cap and incubate the bottles at 30° C. (keep in glove box).

Aliquot a small amount from each of the samples, and measure cATP levels at various times (0, 2, 4, and 24 hrs).

The ATP test can be conducted outside the glove box. Herein we used the second generation ATP method developed by LuminUltra Technologies (Fredericton, New Brunswick, Canada). In this commercially available test, ATP is measured using the firefly luciferase assay, where a sample containing ATP is introduced to a solution containing the enzyme Luciferase, which naturally occurs in the tails of fireflies, to produce light. The light is detected in a luminometer as Relative Light Units (RLU) and correlates with the amount of ATP in the sample.

Measurements can be converted to microbial equivalents using the assumption that 1 picogram cATP equals 1,000 cells/mL The conversion of cATP to cell concentration was used prior to the addition of nitrite to get an idea about the initial cell concentration being used in the test. Following the test (i.e., nitrite addition), we only recorded cATP concentration in picograms per mL vs. time and not cell concentration (see FIG. 1) Therefore, we are not making any assumptions about cell concentrations or microbial equivalents following the addition of nitrite. In the next test, all results regarding cell concentrations following nitrite and/or biocide addition were made using bottle counts (i.e. serial dilutions) in growth media, not ATP testing.

The experimental results in FIG. 1 demonstrate the effect of increasing nitrite concentrations on the ATP levels when employing an approximate initial microbial equivalency of $1.0 \times 10^7$ cells/mL. Approximately 24 hours was required to reach a cATP concentration below 1000 picograms per mL (i.e., >90% reduction in cATP concentrations) when employing 1 mM nitrite; whereas, a nitrite concentration of 2 mM resulted in over a 99% reduction during this same time period.

Following this trend, it can be presumed that concentrations of nitrite in excess of 2 mM will result in even faster reductions in cellular ATP levels and concentrations below 1 mM will result in much slower reductions in ATP. Therefore, this example teaches that nitrite (an ATP-reducing agent) results in a reduction in ATP levels that can be tracked over time and is dependent on the concentration of nitrite as well as the initial concentration of cells. A similar bench top test can be performed on any industrial water to determine in advance of field use what the time period and concentrations should be.

Test 2

A follow-up test was performed to determine the effectiveness of reducing the cATP levels with nitrite on enhanced kill of an SRB culture. The test was similar to the above, but 8 different samples were prepared, and SRM viability (i.e., blackening of medium) and growth was assessed employing tenfold serial dilutions in SRB growth medium (SRB bottles with 1% NaCL; C&S Laboratories, Broken Arrow, Okla.) over a 3 to 4 week incubation at 30° C. following the various treatments described below. The test samples were as follows:

| | |
|---|---|
| Bottle 1 | Control - inoculant, no nitrite, no GA, incubate 2 hrs and test SRB viability |
| Bottle 2 | Inoculant, nitrite (2.0 mM) alone, no GA, incubate 2 hrs and test SRB viability |
| Bottle 3 | Inoculant, GA alone (20 ppm w/v or 0.2 mM), incubate 2 hrs, and test SRB viability |
| Bottle 4 | Inoculant, nitrite (2.0 mM) & GA (20 ppm or 0.2 mM) simultaneous, incubate 2 hrs, and test SRB viability |
| Bottle 5 | Pre-treatment Control - inoculant, no nitrite, no GA, incubate 26 hrs and test SRB viability |
| Bottle 6 | Inoculant, nitrite alone (2.0 mM), incubate 26 hrs and test SRB viability |
| Bottle 7 | Inoculant, incubate 24 hrs, add GA alone (20 ppm or 0.2 mM), incubate for another 2 hrs and test for SRB viability |
| Bottle 8 | Inoculant, nitrite (2.0 mM), incubate 24 hrs, add GA (20 ppm or 0.2 mM), incubate for another 2 hours and test for SRB viability |

The first four bottles (1-4) were prepared to test the effect of adding nitrite and biocide (i.e., glutaraldehyde) simultaneously (i.e., no nitrite pre-treatment) on SRM viability; whereas, the last four bottles tested the effect of a 24 hour pre-treatment with nitrite prior to addition of biocide (i.e., glutaraldehyde) on SRM viability. SRB viability (as determined by blackening of medium) and growth was assessed at 1, 2, 3 and 4 weeks using ten-fold, serial dilutions of test media in SRB bottles to determine if the treatment killed the cells or merely inhibited them for a period of time.

It was surprisingly discovered that only bottle 8—nitrite pre-treatment for 24 hours followed by GA—resulted in complete kill (i.e., an 8 log reduction in SRB viability) compared to only a 2 log reduction in kill for bottle 4 where nitrite and GA were added together without any nitrite pre-treatment. Other bottles resulted in either no reduction in SRB viability or only a 1 or 2 log reduction.

Our experimental results thus demonstrate that 2 mM nitrite for 24 hours pre-treatment decreased the cellular tolerance for glutaraldehyde and provided an enhanced kill effect to prevent growth under cultivation conditions. Using nitrite and GA at the same time, or either alone did not provide this effect.

These tests demonstrate that for initial SRB concentrations approximating $6.9 \times 10^6$ to $1.45 \times 10^9$ that a timed pre-treatment with the ATP-reducing agent nitrite followed by biocide treatment is much more effective than biocide treatment alone, than ATP-reducing agent treatment alone, or than simultaneous treatment with biocide and ATP-reducing agent treatment.

This initial estimated concentration of SRB is well within the estimated initial SRB concentration (i.e., $1.0 \times 10^7$ cells/mL) employed in Test 1 (FIG. 1). Therefore, this test, demonstrates that a presumed cATP reduction of greater than 90% but less than 97% is enough to see this enhanced kill effect. We thus define enhanced kill as at least 3-log, preferably at least 4-5-log, more preferred 6-log or even 8-log increase in kill vs. without pre-treatment to reduce ATP.

Recommended treatment for the removal or prevention of SRB and other cells in a hydrocarbon pipelines, retention ponds, tanks, vessels, heat exchangers, wellbore, near wellbore, or other equipment involve pumping an ATP-reducing agent solution into the equipment for a first treatment period of e.g., 12-48 hours followed by pumping of a biocide solution into the reservoir for a second treatment period of e.g., 12 hours to 2 weeks. Because the treatment flows through (or soaks) the tubing, pipes, and equipment—the treatment can be used to remove cellular contamination from all equipment it is exposed to including the storage tanks, pumps, pipes, and the like.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or process or certain features may be omitted, or not implemented.

In addition, the various embodiments described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and may be made without departing from the spirit and scope disclosed herein.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description and abstract are not to be used to limit the scope of the invention. The invention is specifically intended to be as broad as the claims below and their equivalents.

REFERENCES

All of the references cited herein are expressly incorporated by reference for all purposes. The discussion of any reference is not an admission that it is prior art to the present invention, especially any reference that may have a publication data after the priority date of this application. Incorporated references are listed again here for convenience:

1. Burger, E. D. (2004). Synergism of anthraquinone with an oilfield biocide to inhibit sulfide generation from sulfate-reducing bacteria. Paper 04750, Corrosion 2004, NACE International, Houston, Tex.
2. Carlson, H. K. et al. (2015) Monofluorophosphate is a selective inhibitor of respiratory sulfate-reducing microorganisms. Environ. Sci. Technol. 49:3727-3736.
3. Chapman, A. G. et al. (1971) Adenylate energy charge in *Escherichia coli* during growth and starvation. J. Bacteriol. 108(3):1072-1086.
4. Cooling III, F. B. et al. (1996) Inhibition of sulfate respiration by 1,8-dihydroxyanthraquinone and other anthraquinone derivatives. Appl. Environ. Microbiol. 62(8):2999-3004.
5. Haveman, S. A., et al., Physiological and Gene Expression Analysis of Inhibition of *Desulfovibrio vulgaris* Hildenborough by Nitrite, J. Bacteriol. 186(23):7944-7950 (2004).
6. Kaprelyants, A. S., et al., Dormancy in non-sporulating bacteria, FEMS Microbiology Reviews 104:271-286 (1993).
7. Kaster, K. M., et al., Effect of nitrate and nitrite on sulfide production by two thermophilic, sulfate-reducing enrichments from an oil field in the North Sea, Appl Microbiol Biotechnol 75(1):195-203 (2007).
8. Keasler, V. et al. (2012) Expanding the microbial monitoring toolkit: Evaluation of traditional and molecular methods. Intl. Biodeterioration & Biodegradation 81:51-56.
9. Kim, J. et al. (2009) Tolerance of dormant and active cells in *Pseudomonas aeruginosa* PA01 biofilm to antimicrobial agents. J. Antimicrobial Chemotherapy 63:129-135.
10. Liu, H. et al. (2011) Chemical inhibitors of methanogenesis and putative applications. Appl. Microbiol. Biotechnol. 89:1333-1240.
11. NACE Standard Test Method (2004) Field Monitoring of Bacterial Growth in Oil and Gas Systems. NACE TMO194-2004, Item Number 21224.
12. Postgate, J. R. (1952) Competitive and Non-competitive inhibitors of bacterial sulphate reduction. J. gen. Microbiol. 6:128-142.
13. Taylor B. F. and Oremland, R. S. (1979) Depletion of Adenosine Triphosphate in *Desulfovibrio* by oxyanions of Group VI elements. Curr. Microbiol. 3(2):101-103.
14. US20050238729, U.S. Pat. Nos. 7,833,551, 8,846,732 "Inhibition of biogenic sulfide production via biocide and metabolic inhibitor combination".
15. U.S.20180295838 "Enhanced kill of sulfate reducing bacteria using timed sequential addition of oxyanion and biocide".
16. U.S. Pat. No. 9,089,514 "Composition and method for inhibiting biogenic sulfide generation".
17. Xue Y. & Voordouw G., Control of Microbial Sulfide Production with Biocides and Nitrate in Oil Reservoir Simulating Bioreactors, Front. Microbiol. 2015; 6: 1387.

What is claimed is:

1. A method of, killing microbes in an aqueous medium, the method comprising:
   a) contacting microbes present in an aqueous medium with a first concentration of an ATP-reducing agent sufficient to significantly stress but not kill said microbes by reducing ATP levels at least 90%;
   b) waiting a first period of time to significantly stress said microbes by reducing ATP levels in said microbes; and
   c) contacting said stressed microbes with a second concentration of a biocide sufficient to kill said, stressed microbes in a second period of time, wherein said second concentration of biocide is lower than would be needed with simultaneous treatment with said ATP-reducing agent and said biocide.

2. The method of claim 1, wherein the ATP-reducing agent is selected from the group consisting of nitrite, molybdate, tungstate, selenate, anthraquinone, and combinations of one or more thereof.

3. The method of claim 1, wherein the ATP-reducing agent is selected from the group consisting of nitrite, nitrate, molybdate, arsenate, chromate, tungstate, chlorate, perchlorate, thiosulfate, fluorosulfate, selenite, selenate, monofluorophosphate, 9,10 anthraquinone, 9, 10 anthraquinone derivatives, phenolic lipids, and combinations of one or more thereof.

4. The method of claim 1, wherein the biocide is selected from the group consisting of formaldehyde, glutaraldehyde, acrolein, quaternary amine compounds, cocodiamine, bronopol, 2-2-dibromo-3-nitrilo-propionamide (DBNPA), isothiazolone, THPS, carbamates, metronidazole, and combinations of one or more thereof.

5. The method of claim 1, wherein the biocide is selected from the group consisting of formaldehyde, glutaraldehyde, acrolein, quaternary amine compounds, cocodiamines, bronopol, 2-2-dibromo-3-nitrilo-propionamide (DBNPA), isothiazolones, carbamates, metronidazole, Tetrakis (Hydroxymethyl) Phosphonium Sulfate (THPS), Tributyl Tetradecyl Phosphonium Chloride (TTPC), chlorine, bromine, hypochlorite, chlorine dioxide, hydrogen peroxide, peracetic acid, ozone, and combinations of one or more thereof.

6. The method of claim 1, wherein the first period of time is 2 hours to 2 weeks.

7. The method of claim 1, wherein the first period of time is 1 hour to 48 hrs.

8. The method of claim 1, wherein the first period of time is about 24 hrs.

9. The method of claim 1, wherein the second period of time is about 1 hour to 4 weeks.

10. The method of claim 1, wherein the second period of time is about 24-48 hours.

11. The method of claim 1, wherein the first and second periods of time are determined by prior bench top tests.

12. The method of claim 1, wherein the MP-reducing agent comprises nitrite.

13. The method of claim 1, wherein the aqueous medium is an oilfield water.

14. The method of claim 1, wherein the ATP-reducing agent is selected from the group consisting of nitrite, molybdate, tungstate, selenate, anthraquinone, and combinations of one or more thereof, and wherein the biocide is selected from the group consisting of formaldehyde, glutaraldehyde, acrolein, quaternary amine, compounds, cocodiamine, bronopol, 2-2-dibromo-3-nitrilo-propionamide (DBNPA), isothiazolone, carbamates, metronidazole, and combinations of one or more thereof.

15. The method of claim 1, wherein said microbes are sulfate reducing microbes.

16. A method of killing microbes in an industrial water, the method comprising:
    a) contacting microbes present in an industrial water with a first concentration of an ATP-reducing agent sufficient to significantly stress but not kill said microbes by reducing ATP levels at least 90%;
    b) waiting a first period of time to significantly stress but not kill said microbes by reducing ATP levels at least 90% in said microbes; and
    c) contacting said stressed microbes with a second concentration of a biocide sufficient to kill said stressed microbes in a second period of time;
    d) wherein said second concentration of said biocide is lower than would be needed with simultaneous treatment with said ATP-reducing agent and said biocide;
    wherein the biocide is selected from the group consisting of formaldehyde, glutaraldehyde, acrolein, quaternary amine compounds, cocodiamines, bronopol, 2-2-dibromo-3-nitrilo-propionamide (DBNPA), isothiazolones, carbamates, metronidazole, Tetrakis (Hydroxymethyl) Phosphonium Sulfate (THPS), Tributyl Tetradecyl Phosphonium Chloride (TTPC), chlorine, bromine, hypochlorite, chlorine dioxide, hydrogen peroxide, peracetic acid, ozone, and combinations of one or more thereof; and
    wherein the ATP reducing agent is selected from the group consisting of nitrite, nitrate, molybdate, arsenate, chromate, tungstate, chlorate, perchlorate, thiosulfate, fluorosulfate, selenite, selenate, monofluorophosphate, 9,10 anthraquinone, 9, 10 anthraquinone derivatives, phenolic lipids and combinations of one or more thereof.

17. The method of claim 16, wherein said ATP-reducing agent comprises 1-2 mM nitrite and said first period of time is 12-24 hours and said biocide comprises 0.2 mM glutaraldehyde and said second period of time is 1-3 hours.

18. The method of claim 16, wherein said industrial water comprises a hydrocarbon pipeline, retention pond, tank, vessel, heat exchanger, wellbore, near wellbore, or oilfield equipment.

19. A method of killing microbes in an industrial water, the method comprising:
    a) contacting microbes present in an industrial water with a first concentration of an ATP-reducing agent sufficient to significantly stress but not kill said microbes by reducing ATP levels at least 90%;
    b) waiting a first period of time to significantly stress but not kill said microbes by reducing ATP levels at least 90% in said microbes; and
    c) contacting said stressed microbes with a second concentration of a biocide sufficient to kill said stressed microbes in a second period of time;
    wherein said second concentration of said biocide is lower than would be needed with simultaneous treatment with said ATP-reducing agent, and
    wherein said ATP-reducing agent comprises 1-2 mM nitrite and said first period of time is 12-24 hours and said biocide comprises 0.1-0.3 mM glutaraldehyde and said second period of time is 1-12 hours.

20. A method of killing microbes in an industrial water, the method comprising:
    a) contacting microbes present in an industrial water with 1-3 mM nitrate;
    b) waiting 12-24 hours to significantly stress but, not kill said microbes by reducing ATP levels at least 90% in said microbes; and
    c) contacting said stressed microbes with 0.1-0.3 mM glutaraldehyde biocide sufficient to kill said stressed microbes in 1-12 hours;
    wherein said biocide is less than would be needed with simultaneous treatment with said ATP-reducing agent.

21. A method of killing microbes in hydrocarbon equipment, the method comprising:
    a) contacting microbes present in hydrocarbon equipment with a first concentration of an ATP-reducing agent sufficient to significantly stress but not kill said microbes by reducing ATP levels at least 90%, wherein said microbes are sulfate-reducing, acetogenic, acid-producing or methanogenic;
    b) waiting a first period of time to significantly stress but not kill said microbes by reducing ATP levels at least 90% in said microbes; and
    c) contacting said stressed microbes with a second concentration of a biocide sufficient to kill said stressed microbes in a second period of time;
    d) wherein said second concentration of said biocide is lower than would be needed with simultaneous treatment with said ATP-reducing agent and said biocide.

22. The method of claim 21, wherein the biocide is selected from the group consisting, of formaldehyde, glutaraldehyde, acrolein, quaternary amine compounds, cocodiamines, bronopol, 2-2-dibromo-3-nitrilo-propionamide (DBNPA), isothiazolones, carbamates, metronidazole, Tetrakis (Hydroxymethyl) Phosphonium Sulfate (THPS) Tributyl Tetradecyl Phosphonium Chloride (TTPC), chlorine, bromine, hypochlorite, chlorine dioxide, hydrogen peroxide, peracetic acid, ozone, and combinations of one or more thereof.

23. The method of claim 21, wherein the ATP-reducing agent is selected from the group consisting of nitrite, molybdate, tungstate, selenate, anthraquinone and combinations of one or more thereof and wherein the biocide is selected from the group consisting of formaldehyde, glutaraldehyde, acrolein, quaternary amine compounds, cocodiamine, bronopol, 2-2-dibromo-3-nitrilo-propionamide (DBNPA), isothiazolone, carbamates, metronidazole, and combinations of one or more thereof.

24. The method of claim 21, wherein said ATP-reducing agent comprises 2 mM nitrite and said first period of time is 12-24 hours and said biocide comprises 0.2 mM glutaraldehyde and said second period of time is 1-3 hours.

25. The method of claim 21, wherein said hydrocarbon equipment comprises a hydrocarbon pipeline, retention pond, tank, vessel, heat exchanger, wellbore, near wellbore, or oilfield equipment.

* * * * *